United States Patent Office 3,094,516
Patented June 18, 1963

3,094,516
AZO DYESTUFFS CONTAINING A BENZENE RING SUBSTITUTED BY TWO HYDROXYETHYLSULFONYLMETHYL GROUPS
David I. Randall, New Vernon, N.J., Saul R. Buc and Harlan B. Freyermuth, Easton, Pa., and Raymond L. Mayhew, Phillipsburg, N.J., assignors to General Aniline & Film Corporation, New York, N.Y., a corporation of Delaware
No Drawing. Filed Dec. 30, 1959, Ser. No. 862,802
6 Claims. (Cl. 260—163)

This invention relates to novel azo dyestuffs and more particularly to azo dyestuffs capable of dyeing textile fibers in any desired shades of improved fastness properties and the like.

It is an object of this invention to provide a class of novel azo dyestuffs capable of dyeing textile fibers and the like. Another object of this invention is the provision of such a class of dyestuffs which may be employed in dyeing textile fibers to produce dyeings having improved properties such as fastness, and/or brightness and the like. A further object of this invention is to provide water-soluble azo dyestuff molecules which are conveniently suitable for use of the dyer and which do not precipitate prematurely during dyeing or padding operations. A still further object of this invention is the provision of such a class of dyestuffs which may be readily manufactured without undue degradation of the dyestuff and other undesired effects. Yet another object of this invention is the provision of such a class of dyestuffs which will not be subject to the disadvantages attributable to prior art dyestuffs. Other objects and advantages will appear as the description proceeds.

The attainment of the above objects is made possible by the present invention which includes the provision of azo dyestuffs having the formula

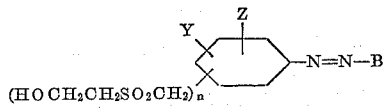

wherein Y and Z are selected from the group consisting of H, lower alkyl and lower alkoxy; $n$ has a value of 2 to 3; and B represents the residue of an azo coupling component containing a sufficient number of solubilizing groups to solubilize the dyestuff.

It has been found that dyestuffs of the above formula are readily and economically manufactured, relatively speaking, and are readily applied from aqueous media to textile fibers and the like by dyeing and printing for the production of dyeings having improved fastness and other properties. The presence of a non-removable solubilizing group has been found decidedly advantageous in avoiding premature precipitation during the dyeing process. While earlier practice would lead one to believe that retaining a non-removable, water-soluble grouping in the dye-stuff moiety would impair wash-fastness, it has been found that in the case of the subject dyestuffs this effect is outweighed by the improved bonding, reaction or attraction between the dye and the fiber.

Azo dyestuffs containing nuclearly bound sulfatoethylsulfonylmethyl groups have been previously proposed, but none of these dyestuffs contain more than one such group substituted in a single nucleus or, as in the present dyestuffs, at least two nuclearly substituted hydroxyethylsulfonylmethyl groups, which groups are essential for the attainment of applicants' desired results, as will be more fully discussed below. Further, the dyestuffs of this invention may be prepared without subjecting them to the possibly deleterious effects of an oxidation step as required in converting the hydroxyethylmercaptomethyl-containing intermediate to the corresponding sulfone.

The dyestuffs of this invention may be readily prepared in known manner by diazotizing a compound having the formula

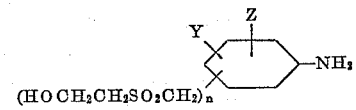

and coupling the diazotized compound with any azo coupling component B; Y, Z, B and $n$ having the values given above.

In the above formulae, Y and Z may represent H, lower alkyl such as methyl and ethyl, or lower alkoxy such as methoxy and ethoxy. The solubilizing group in the coupling component B is preferably a sulfonic acid group, although in some instances carboxylic acids, sulfonamide, and other similar groups may be employed to solubilize the dyestuff. A sufficient number of such solubilizing groups are present to solubilize the dyestuff. Such solubilizing groups may be present in the coupling component prior to the coupling reaction, or they may be inserted subsequently to the coupling reaction, for example by sulfonation or the like. No claim is here made to the diazo components employed in the production of the present dyestuffs. Such diazo components may be prepared by polychloromethylating a nitrobenzene with bis-chloromethyl ether in sulfuric acid or chlorosulfonic acid, or with formaldehyde, zinc chloride and HCl, followed by reacting the resulting polychloromethylated derivative with mercaptoethanol, oxidizing hydroxyethylmercaptomethyl groups in the resulting intermediate through the sulfoxide to the sulfone, and finally reducing the nitro group to the corresponding amine. The preferred diazo component is 5-amino-2-methyl-m-xylylene-$\alpha^1,\alpha^3$-bis(2-sulfonylethanol), prepared by bischloromethylating 4-nitrotoluene, reacting the bischloromethylated derivative with mercaptoethanol, oxidizing the sulfide through the sulfoxide to the sulfone, and finally reducing the nitro group to the corresponding amine. This compound has been found to yield optimum results with respect to fastness properties and the like.

Any azo coupling component may be employed to provide the B component in the present dyestuffs. The identity and characteristics of such coupling components has been well documented, as for example see "Chemistry of Synthetic Dyes," by Venkataraman, Academic Press, 1952, volume I, beginning at page 409. Generally, such compounds are capable of coupling by reason of an anionoid or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Usually, the diazonium coupling reaction with these coupling components is explicable by mechanism which is in consonance with the accepted theory of aromatic substitution. The yield in the coupling reaction depends on the electronegativity and accessibility of the site in the carbocyclic or heterocyclic compound at which the attachment of the diazonium group is to take place and on the pH of the reaction mixture which may fall within the acid, neutral or basic range depending upon the particular coupling component employed. The diazonium group attacks a position which has been activated as a site of high electron density. Coupling therefore takes place in the ortho or para position to the directing hydroxyl or amino group in the coupling component. If both of these positions are occupied, no coupling will take place or one of the substituents will be displaced.

Another important group of azo coupling components are the heterocyclic compounds containing a reactive nuclear methylene group usually associated with an adjacent keto group (keto-methylene linkage) as in the 5-pyrazolones.

Still another important group of azo coupling components are the compounds containing an aliphatic or alicyclic ketomethylene group as in the acylacetic acid arylides and esters.

As examples of suitable azo coupling components falling within the above classifications, there may be mentioned anilines, aminonaphthalenes, phenols, naphthols, pyrrols, indoles, 2-hydroxycarbazoles, 3-hydroxydibenzofurans, 2-naphthol-3-carboxylic acid arylamides, amino and hydroxy pyridines, pyridones and pyrimidines, 2,4-dihydroxyquinoline, 9-methylacridine, 5-pyrazolone, 1-phenyl-3-methyl-5-pyrazolone, 1-phenyl-5-pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

As stated above, the coupling component should contain a solubilizing group for the purpose of rendering the azo dyestuff soluble in the aqueous media commonly employed for dyeing. As employed herein, the term "soluble" is intended to cover the property of solubility or ready dispersibility in aqueous medium. In some instances, the nature of the coupling component may be such as to solubilize the azo dyestuff without the inclusion therein of any specific solubilizing groups. In most instances, however, it is preferred to employ coupling components containing at least one such solubilizing group, preferably a sulfonic acid group. The above described and other azo coupling components containing such groups, and methods for their production, are well known to those skilled in the art.

The azo dyestuffs of this invention have been found to be highly effective for dyeing and printing natural and synthetic fibers, particularly cellulosic fibers, in any desired shades of good to excellent fastness properties such as wash-fastness and the like. The dyeing or printing is preferably carried out by application of the dyestuff to the fibrous material followed by curing at a temperature above about 220° C., the maximum temperature being limited by the heat resistance of said material. The fibrous material may be in any of the usual forms, as for example, in the form of staple fiber or continuous filaments in bulk form or in the form of tow, rope, yarns, slubbings, warps, fabrics, felts and the like, and treated as a wound package, running lengths, fibrous stock, bulk, etc. In addition to cellulose, these dyestuffs are also highly effective for dyeing and printing other fibers, including natural and synthetic polyamides such as wool, silk, casein, zein, nylon and polyurethane fibers, polymeric carboxylic acid fibers, and the like.

The dyestuffs of this invention enable the production of dyeings having excellent fastness to wash, light, crocking, and acid and alkaline perspiration.

The mechanism by which the azo dyestuffs of this invention yield dyeings of improved fastness properties and the like is apparently due to a reaction between the hydroxyethylsulfonylmethyl groups in the dyestuff and reactive hydrogen atoms in the fiber, e.g. an etherification reaction with the hydroxy groups in cellulose, an esterification reaction with carboxy groups in synthetic fibers containing recurring carboxylic groups in the polymer chain, etc. When the preferred bis-hydroxyethylsulfonylmethyl-(preferably in meta position)-containing azo dyestuffs of this invention are employed, a further possibility of crosslinking exists which would yield further improvements in fastness properties, and the like.

The following examples are only illustrative of the present invention and are not to be regarded as limitative. All parts and proportions referred to herein and in the appended claims are by weight unless otherwise indicated.

Example 1

8.8 parts of 5-amino-2-methyl-m-xylylene-$\alpha^1,\alpha^3$-bis-(2-sulfonylethanol) are dissolved in a solution of 50 parts of water and 7 parts concentrated hydrochloride acid (specific gravity 1.191) and diazotized in the usual manner at 0–5° C. with 18 parts of a 10% solution of sodium nitrite. The excess sodium nitrite is destroyed by the addition of 2 parts of a 10% solution of sulfamic acid.

The diazo slurry is added to a solution of 6.7 parts p-(3-methyl-5-oxo-2-pyrazolin-1-yl)-benzenesulfonic acid, 100 parts of water and 50 parts 20% sodium carbonate solution. After stirring one hour at 20–25° C., the dye is precipitated from solution by the gradual addition of 49 parts of common salt. After stirring an additional two hours, the dye is filtered and dried in a vacuum oven at 85° C. The product, having the following structure,

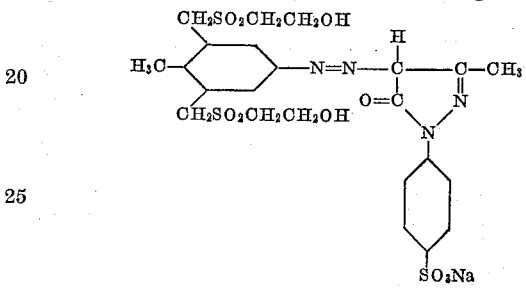

is padded on cotton piece goods in the presence of urea and sodium carbonate and heat cured for 3 minutes at 300° F. thereby producing a brilliant yellow shade with excellent wash fastness and good light fastness and fastness to crocking.

Example 2

The procedure of Example 1 is followed except that 6.7 g. of m-(3-methyl-5-oxo-2-pyrazolin-1-yl)-benzenesulfonic acid are used as the coupler. The dye, having the following structure,

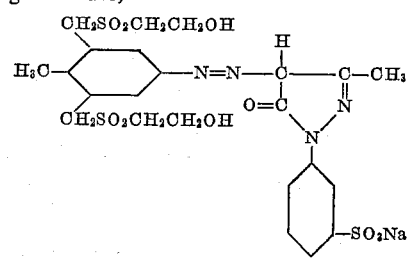

gives a brilliant yellow shade on cotton piece goods when padded in the presence of urea and sodium carbonate and heat cured for 3 minutes at 300° F. The dyeing has excellent fastness properties.

Example 3

The procedure of Example 1 is followed except that 7.6 parts 4-chloro-(3-methyl-5-oxo-2-pyrazolin-1-yl)benzenesulfonic acid are used as the coupler. The dyestuff, having the following structure,

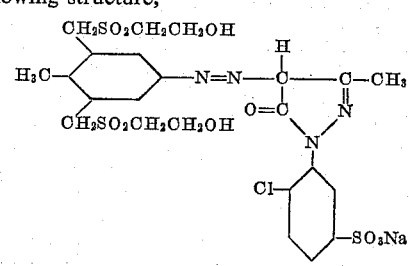

gives a brilliant yellow shade on cotton piece goods with excellent wash fastness and good fastness to light and crocking when padded on cotton in the presence of urea and sodium carbonate and then heat treated for 3 minutes at 300° F.

Example 4

When a similar procedure is followed employing N-acetyl-H-acid as the coupler, a dyestuff is obtained having the formula

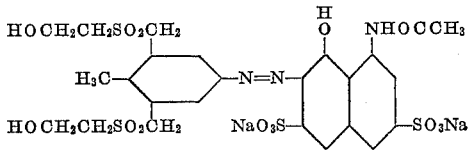

which, when padded on cotton piece goods as described above yields a bright bluish red shade of excellent washfastness properties.

In the following examples, the diazo component employed in the foregoing examples are coupled with the indicated couplers, resulting in dyestuffs of the following general formula, yielding the indicated shades when similarly padded on cotton.

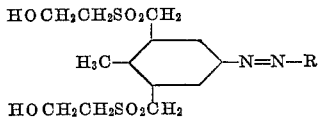

| Example | R=Coupler | Shade of Dyeing |
|---|---|---|
| 5 | 2-naphthylamine-8-sulphonic acid | orange. |
| 6 | 2-naphthylamine-6-sulphonic acid | Do. |
| 7 | 2-amino-5-naphthol-1,7-disulphonic acid | Do. |
| 8 | 1-naphthol-3,6-disulphonic acid | scarlet. |
| 9 | 1-naphthylamine-3,8-disulphonic acid | violet. |
| 10 | 2-naphthol-8-sulphonic acid | orange. |
| 11 | 2-naphthylamine-3,6,8-trisulphonic acid | tan. |
| 12 | 1-amino-7-naphthol | violet. |
| 13 | 1-naphthol-8-sulphonic acid | Do. |
| 14 | 2,3-dihydroxynaphthalene | Do. |
| 15 | 2,3-dihydroxynaphthalene-6-sulphonic acid | brown. |
| 16 | 1-amino-5-naphthol | Do. |
| 17 | 2-naphthol-3,6,8-trisulphonic acid | scarlet. |
| 18 | 1,5-dihydroxynaphthalene | violet. |
| 19 | 1-naphthylamine-3,6,8,-trisulphonic acid | Do. |
| 20 | 2-naphthylamine-5-sulphonic acid | yellow. |
| 21 | 1-naphthol-5-sulphonic acid | red. |
| 22 | 1-naphthol-3-sulphonic acid | pink. |
| 23 | 1-naphthylamine-7-sulphonic acid | orange. |
| 24 | 1-naphthylamine-5-sulphonic acid | Do. |
| 25 | 1-naphthylamine | violet. |
| 26 | 1-naphthylamine-3,6-disulphonic acid | orange. |
| 27 | 1-naphthylamine-3-sulphonic acid | Do. |
| 28 | 1-amino-5-naphthol-2,7-disulphonic acid | violet. |
| 29 | 1-naphthylamine-8-sulphonic acid | Do. |
| 30 | 1-naphthylamine-3,8-disulphonic acid | Do. |
| 31 | naphthionic acid | orange. |
| 32 | 2-naphthylamine-3,6-disulphonic acid | Do. |
| 33 | 1-amino-2-naphthol-4-sulfonic acid | Do. |
| 34 | 1-naphthol-4-sulphonic acid (Neville and Winter's acid) | scarlet. |
| 35 | 2-oxy-naphthionic acid | pink. |
| 36 | 2-amino-8-naphthol-3,6-disulphonic acid | violet. |
| 37 | 2-naphthol-6-sulfonic acid (Schaeffer's acid) | orange. |
| 38 | 2-naphthol-6,8-disulphonic acid (Gamma acid) | Do. |
| 39 | 2-naphthol-3,6-disulphonic acid (R acid) | scarlet. |

Other suitable diazo components may be employed in the above examples, such as 5-amino-4-methyl- or -4-ethoxy- or -2-methoxy-m-xylene-$\alpha^1,\alpha^3$-bis(2-sulfonylethanol), 5-amino-m-xylene-$\alpha^1,\alpha^3$-bis(2-sulfonylethanol) and the like. Similarly, any other coupling component, aliphatic, aromatic, or heterocyclic, may be employed.

This invention has been disclosed with respect to certain preferred embodiments and various modifications and variations thereof will become obvious to the person skilled in the art. It is to be understood that such modifications and variations are to be included within the spirit and scope of this invention.

We claim:
1. An azo dyestuff of the formula

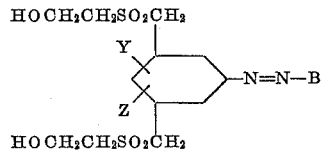

wherein Y and Z are selected from the group consisting of H, lower alkyl and lower alkoxy; and B is the residue of an azo coupling component containing a sufficient number of sulfonic acid groups to water-solubilize the dyestuff.

2. A dyestuff as defined in claim 1 wherein B represents a 5-pyrazolyl radical.

3. A dyestuff as defined in claim 1 wherein B represents a naphthyl radical containing a group promoting coupling.

4. A dyestuff as defined in claim 1 wherein Y is H and Z is methyl.

5. A dyestuff of the formula

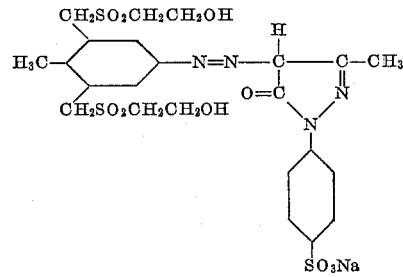

6. A dyestuff of the formula

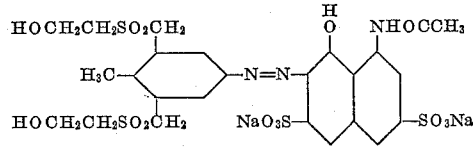

References Cited in the file of this patent

UNITED STATES PATENTS

| 2,151,518 | Krzikalla et al. | Mar. 21, 1939 |
| 2,176,505 | NcNally et al. | Oct. 17, 1939 |
| 2,424,493 | Muller et al. | July 22, 1947 |
| 2,709,167 | Schetty et al. | May 24, 1955 |
| 2,799,672 | Bolliger | July 16, 1957 |